US005260102A

United States Patent [19]

Okamura et al.

[11] Patent Number: 5,260,102
[45] Date of Patent: Nov. 9, 1993

[54] SHAPE-HOLDING COMPOSITE PRESSURE SENSITIVE PLATE

[75] Inventors: Naomi Okamura, Kuki; Akio Nimura, Kawaguchi; Shozo Goda, Tokyo; Toshirou Kaneko, Chiba; Takao Hino, Yokohama, all of Japan

[73] Assignee: Cemedine Co., Ltd., Tokyo, Japan

[21] Appl. No.: 790,978

[22] Filed: Nov. 13, 1991

[30] Foreign Application Priority Data

Nov. 13, 1990 [JP] Japan .................. 2-306657

[51] Int. Cl.⁵ .......................................... B32B 15/08
[52] U.S. Cl. ........................................ 427/457; 428/40; 428/352
[58] Field of Search ............... 428/461, 465, 352, 913, 428/209, 457, 13, 14, 40; 40/152.1, 406, 158.1

[56] References Cited

U.S. PATENT DOCUMENTS

| | | | |
|---|---|---|---|
| 3,956,837 | 5/1976 | Itano | 40/152.1 |
| 4,101,698 | 7/1978 | Dunning et al. | 420/209 X |
| 4,662,093 | 5/1987 | Suttles et al. | 428/13 X |
| 4,885,194 | 12/1989 | Tight, Jr. et al. | 428/913 X |

Primary Examiner—Thomas J. Herbert, Jr.
Attorney, Agent, or Firm—Nikaido, Marmelstein Murray & Oram

[57] ABSTRACT

A shape-holding composite pressure sensitive plate comprising a substrate of organic high-polymer, a metal sheet attached to one surface of the substrate and adapted to be bent by hand and to hold, in free form, its shape, a pressure sensitive adhesive applied to the other surface of the substrate, and a release liner peelably attached to the other surface of the substrate via the pressure sensitive adhesive.

15 Claims, 5 Drawing Sheets

SHAPE-HOLDING COMPOSITE PRESSURE SENSITIVE PLATE

BACKGROUND OF THE INVENTION

1. Field of the Invention

This invention relates to a shape-holding composite pressure sensitive plate which is adapted, for example, to connect or secure an article or a member in a desired posture when assembling, displaying or photographing the article, which is adapted to prevent an ornament or article from falling down, and which is adapted to reinforce and protect a corner of an article or a member.

2. Description of the Related Art

A device in which a release liner is peelably attached to one surface of a plastic substrate via a pressure sensitive adhesive is currently known for filling the gap between adjacent parts such as of a kitchen unit. Another device, in which a pressure sensitive adhesive is applied to the opposite surfaces of a plastic substrate and a pair of release liners are peelably attached to the respective pressure sensitive adhesive surfaces of the substrate, is now put on the market as an adhesive double-coated tape. For attaching an article to a wall by using the adhesive double-coated tape, one adhesive surface of the adhesive double-coated tape is stuck on the wall, and then the article is attached to the other adhesive surface of the tape. Although this adhesive double-coated tape is conveniently used to join two elongated members together face to face, it is inconvenient when joining these two members end to end. If two elongated members were connected together end to end by using a tape with one face coated with a pressure sensitive adhesive, these two members would have become dangling from one another at the joint, because the tape is not so stiff and cannot hold its own shape. Consequently, using this pressure sensitive tape, it is difficult to join two members together in a desired posture, e.g. at right angles.

To this end, attempts have been made to join two members together in a desired posture, e.g. at right angles. One of the most practical way to realize such connection was to apply an adhesive agent to the confronting surfaces of the two members and then to hold the two members in a proper posture until the adhesive agent becomes hardened, which is laborious and time-consuming.

To display an article three-dimensionally requires a three-dimensional display equipment and hence cannot be performed with ease.

Further, there is currently unknown a device which is adapted to be connected to an ornament or article easily for preventing the ornament or article from falling down due to an earthquake.

There is also currently unknown a device for reinforcing a corner such as of an article to protect the corner from being damaged when brought into contact with another article.

SUMMARY OF THE INVENTION

It is therefore an object of this invention to provide a shape-holding composite pressure sensitive plate which is adapted to connect or secure an article or a member thereof in a desired posture easily, which enables three-dimensional displaying of an article, which can prevent an ornament or article from falling down, and which can reinforce a corner of an article or a member thereof to protect the corner.

According to this invention, there is provided a shape-holding composite pressure sensitive plate comprising: a substrate of organic high-polymer; a metal sheet attached to one surface of the substrate adapted to be bent by hand and to hold, in free form, its shape; a pressure sensitive adhesive applied to the other surface of the substrate; and a release liner peelably attached to the other surface of the substrate via the pressure sensitive adhesive.

If the organic high-polymer of the substrate is foamed resin or elastomer, the plate can be attached to the target article or member neatly.

The metal sheet may be aluminum, iron, copper, brass, stainless steel, etc. and should preferably be aluminum. Further, the metal sheet can be bent by hand and should then hold, in free form, the bent shape. For this purpose, the metal sheet should have a predetermined thickness, which depends on the kind of metal.

If the outer surface of the metal sheet is faced with a facing material such as a plastic film, a sponge sheet, cloth or paint, it is possible to present a fine appearance.

If the shape-holding composite pressure sensitive plate has originally a continuous length, it can be cut off a desired length by a cutter such as scissors when in use. Alternatively, the shape-holding composite pressure sensitive plate may have originally a predetermined size, which depends on the purpose of use.

In combination with a plurality of blocks of a predetermined shape, the shape-holding composite pressure sensitive plate can constitute an assembly set such as a toy kit or a handicraft kit.

DETAILED DESCRIPTION

Figure 1:
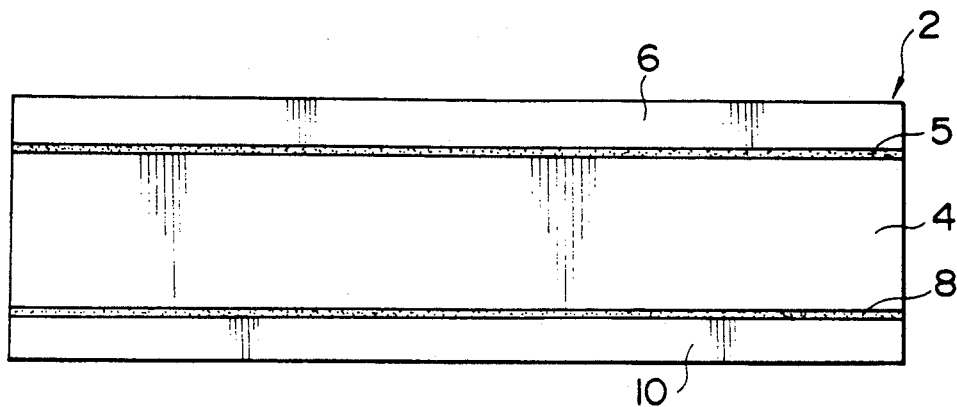
FIG. 1 is a side elevational view showing a shape-holding composite pressure sensitive plate according to one embodiment of this invention.

The principles of this invention are particularly useful when embodied in a shape-holding composite pressure sensitive plate such as shown in FIG. 1, generally designated by reference numeral 2.

As shown in FIG. 1, the shape-holding composite pressure sensitive plate 2 has a substrate 4. The substrate 4 is bendable by hand. If the material of the substrate 4 is organic high-polymer, especially foamed resin or elastomer, the composite pressure sensitive plate 2 can be attached to a target article (to be displayed) or a member (to be connected to another member) neatly.

Foamed organic high-polymer is exemplified by foamed plastic (e.g., foamed polyethylene, foamed polyurethane, foamed polyvinyl chloride and foamed acrylic plymer), foamed synthetic rubber (e.g., foamed styrene-butadien rubber, foamed nitrile rubber, foamed chloroprene rubber, foamed isobutylene-isoprene rubber, foamed isoprene rubber, foamed butadien rubber and foamed ethylene-propylene rubber), and foamed natural rubber.

Elastomer is exemplified by acrylic rubber, styrene-butadien rubber, nitrile rubber, chloroprene rubber, isobutylene-isoprene rubber, isoprene rubber, butadien rubber, and ethylene-propylene rubber).

To one surface of the substrate 4, a metal sheet 6 is attached via an adhesive agent 5. The metal sheet 6 may be aluminum, iron, copper, brass, stainless steel, etc. and should preferably be aluminum. The metal sheet 6 should be bendable by hand and should then hold, in free form, its shape. For this purpose, the metal sheet should have a predetermined thickness, which depends on the kind of metal. In the case of an aluminum sheet, the sheet does not hold its shape if it is too thin, and the sheet is difficult to bent if it is too thick by hand. The thickness of an aluminum sheet according to this invention depends on the kind of aluminum and should preferably be about 0.3 to 0.8 mm.

to the other surface of the substrate 4, a pressure sensitive adhesive 8 is applied. This pressure sensitive adhesive 8 may be an acrylic adhesive mainly having acrylate; an elastomeric adhesive mainly having natural rubber, isobutylene rubber or block copolymerization rubber; or other known adhesives.

Designated by 10 is a release liner peelably attached to the other surface of the substrate 4 via the layer of the pressure sensitive adhesive 8.

Figure 2:
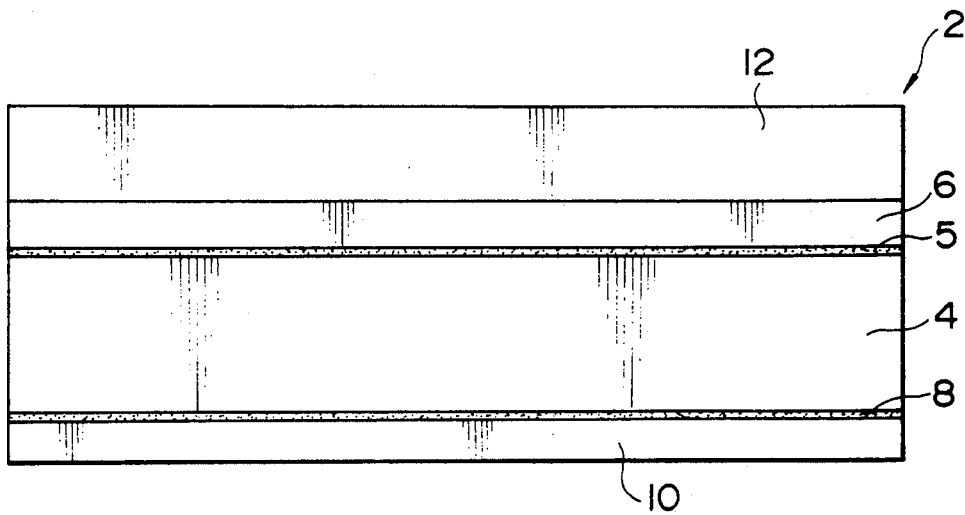
FIG. 2 is a view similar to FIG. 1, showing another embodiment.

If the outer surface of the metal sheet 6 is covered with a plastic film 12 (e.g., a polyvinyl chloride laminated film) as shown in FIG. 2, the resulting plate 2 can present a fine appearance. Alternatively, the outer surface of the metal sheet 6 may be covered with paint, sponge, cloth or paper.

Assuming that the plate 2 has a continuous length and is cuttable, it is possible to obtain a desired length of the plate 2 by cutting the elongated plate 2 by a cutter such as scissors when in use. Alternatively, the plate 2 may have a predetermined size depending on the purpose of use.

Figure 3:
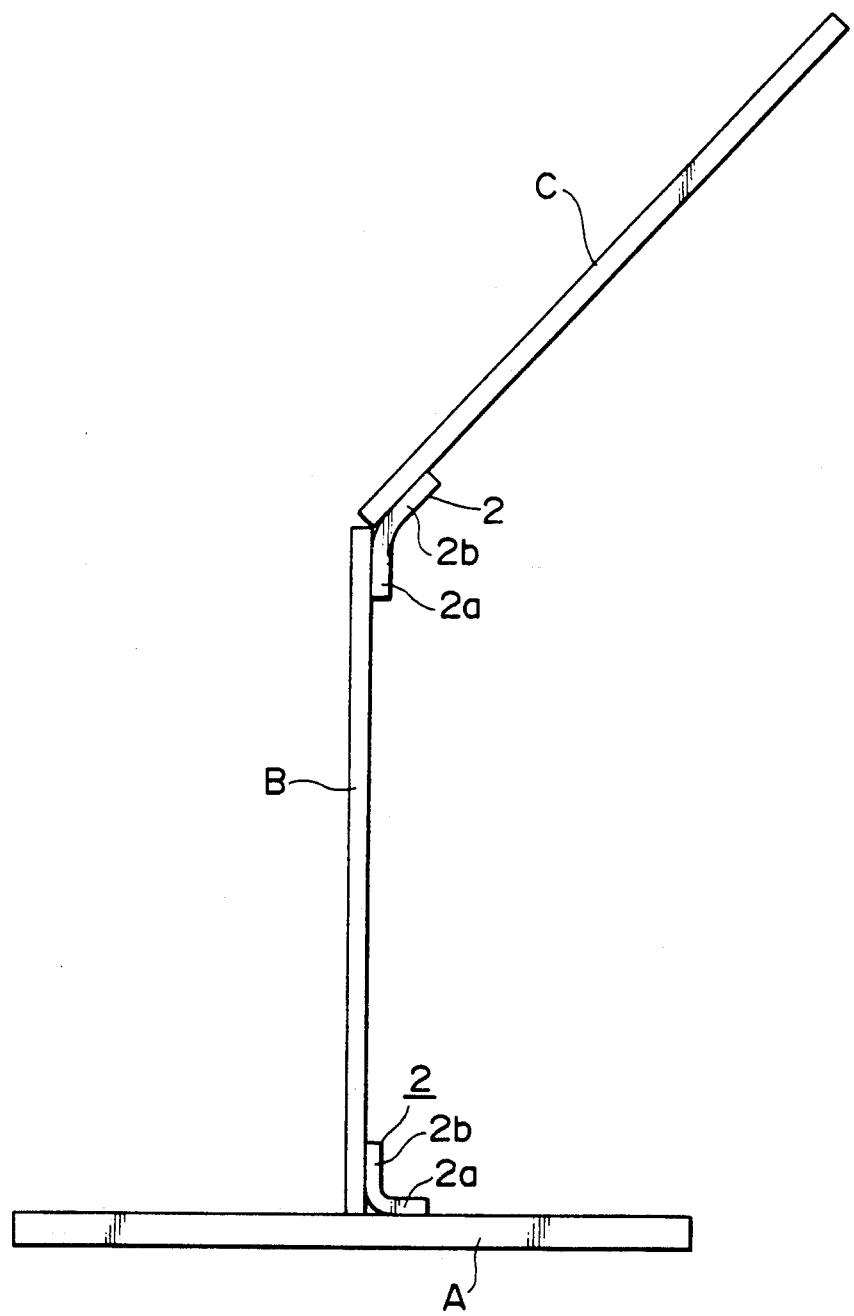
FIG. 3 shows the manner in which a plurality of members are connected to one another by using the shape-holding composite pressure sensitive plates of the invention.

For connecting two members A, B with each other, the plate 2 is bent centrally by a desired angle, i.e. a right angle in the example shown in FIG. 3, and then the release liner 10 is peeled off, whereupon one arm 2a of the bent plate 2 is stuck to one end of the member A and the other arm 2b of the bent plate 2 is stuck to one end of the member B. As a result, the members A, B have been interconnected at a right angle. In this state, the plate 2 holds, in free form, its right-angle posture by the action of the metal sheet 6. If necessary, this angle of connection can be changed by exerting a force on the bent plate 2 by hand after connecting.

Likewise, when connecting another member C to the members B at an angle of 120° C., the plate 2 is bent centrally by 120° C. as shown in FIG. 3.

Figure 4:
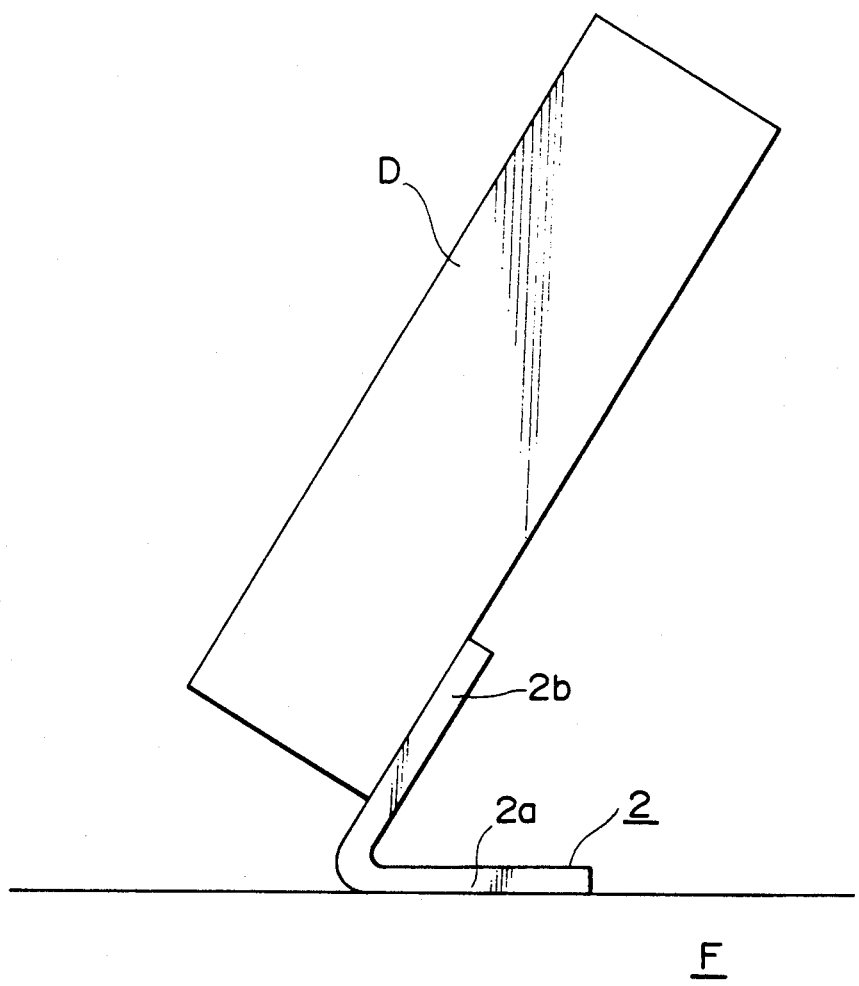
FIG. 4 shows the manner in which an article is displayed by using the shape-holding composite pressure sensitive plate of the invention.

For putting an article D on display, the plate 2 is bent centrally by a desired angle, e.g. ° in the example shown in FIG. 4, and then the release liner 10 is peeled off, whereupon one arm 2a of the bent plate 2 is stuck to a base plate F and the other arm 2b of the bent plate 2 is stuck to the back surface of the article D. As a result, the article D has been displayed three-dimensionally on the base plate F. The plate 2 holds, in free form, this posture.

Also when photographing an article, it is possible to fix the article three-dimensionally in the same manner by using the shape-holding composite pressure sensitive plate 2.

If the shape-holding composite pressure sensitive plate 2 is bent and is then fixed independently on a wall or the like, it can be used as a hook.

Even when connecting two members with each other by an adhesive, the shape-holding composite pressure sensitive plate 2 may be used to assist in temporarily holding the relative position of the members until the adhesive becomes hardened. Thus it is possible to perform connecting of the members with maximum ease.

If one arm of the bent plate 2 is stuck on the base plate at the position in which an ornament or article is to be placed and the other arm of the bent plate 2 is stuck to the back surface of the ornament or article, it is possible to prevent the ornament or article from falling down due to vibration such as of an earthquake.

If the shape-holding composite pressure sensitive plate 2 is bent and stuck to a member's or article's corner astride thereof, it is possible to reinforce and protect the corner.

Assuming that a multiplicity of formative members such as blocks instead of the above-described members A, B, C are connected to one another by using a number of the shape-holding composite pressure sensitive plates 2, it is possible to make a formative work or a toy. Thus the shape-holding composite pressure sensitive plates can be used as connecting components of an assembly kit such as a toy or handicraft kit.

In the illustrated embodiments, the shape of the shape-holding composite pressure sensitive plate 2 is rectangular; however, it should by no means be limited to this specific example and may be any other shape, such as oval, gourd-shaped, square or triangle, depending on the demand.

Figure 5:
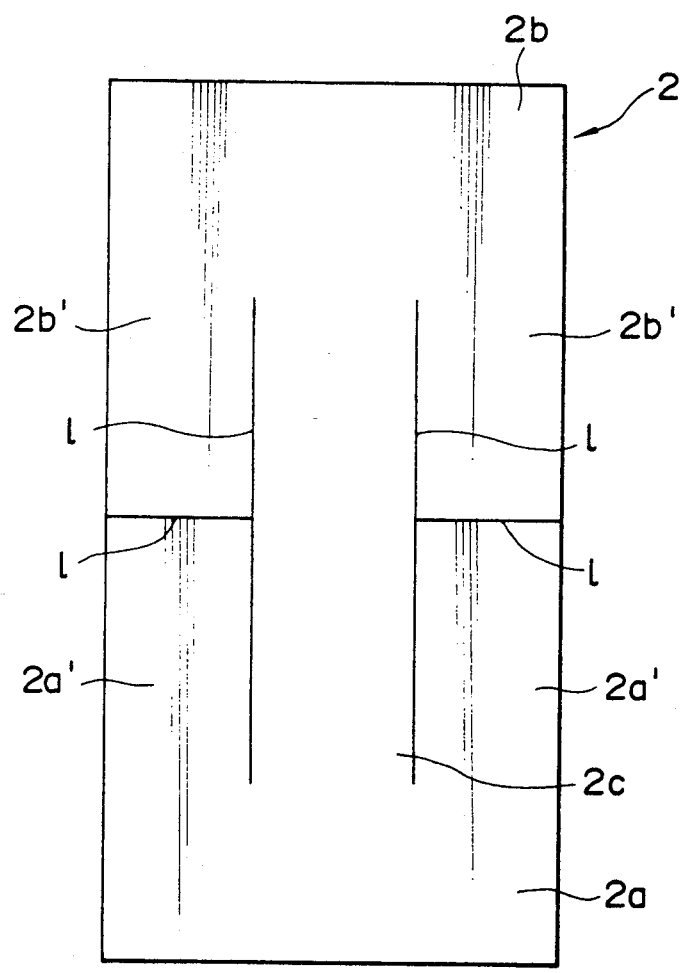
FIG. 5 is a plan view showing a shape-holding composite pressure sensitive plate according to a further embodiment.
Figure 6:
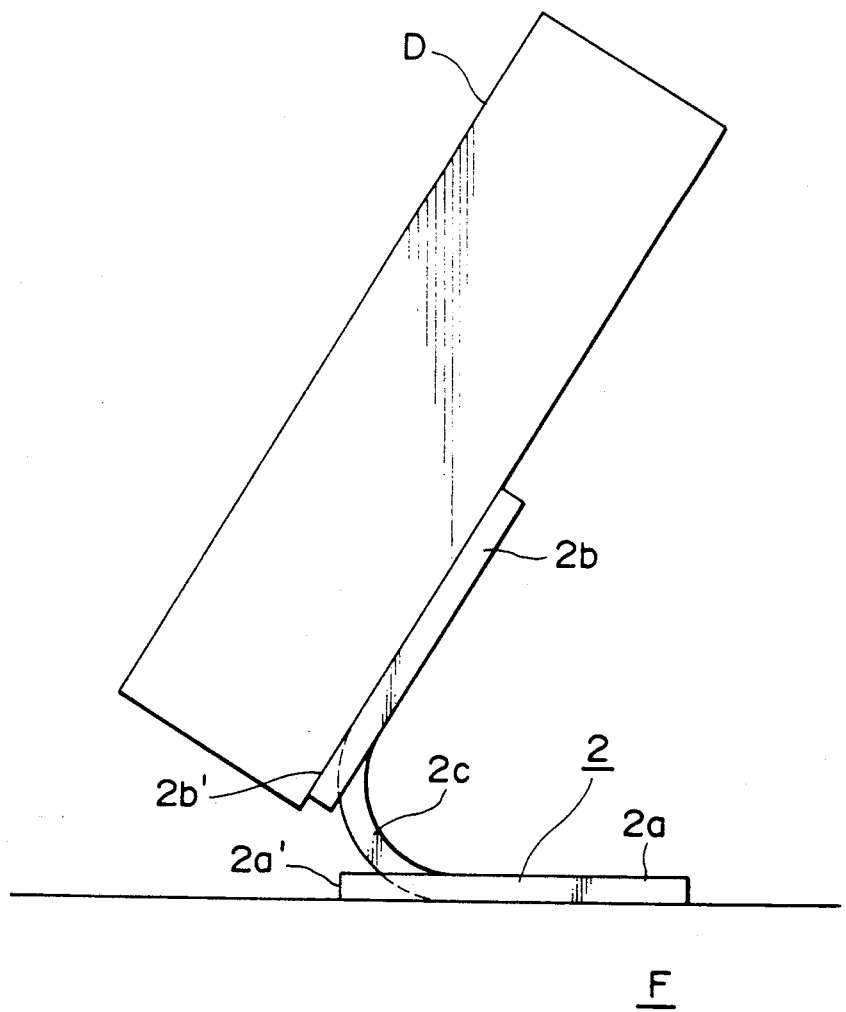
FIG. 6 shows the manner in which an article is displayed by using the shape-holding composite pressure sensitive plate of FIG. 5.

FIG. 5 shows a modified shape-holding composite pressure sensitive plate 2 which originally has cutting lateral lines 1. When this plate 2 is bent, the opposite arms 2a, 2b of the bent plate 2 are bent via a connecting portion 2c so as to have a pair of leg portions 2a', 2b' projecting from the outer surface of the connecting portion 2c. In this embodiment, it is possible to increase the sticking area of the bent plate 2 by the leg portions 2a', 2b' and hence increase the sticking force. If the connecting portion 2c is twisted through different angles, it is possible to selectively create a variety of positional relations of the opposite arms 2a, 2b of the bent plate 2, thus increasing the degree of freedom of display markedly.

According to the shape-holding composite pressure sensitive plate of this invention, it is possible to connect or secure an article or a member thereof in a desired posture easily, to put an article on three-dimensional display, to prevent an ornament or article from falling down, and to reinforce and protect an article's or member's corner. Further, in combination with a plurality of blocks of a predetermined shape, the shape-holding composite pressure sensitive plates can constitute an assembly kit such as a toy or other handicraft kit.

What is claimed is:

1. An assembly set comprising:
   (a) at least one shape-holding composite pressure sensitive supporting plate member including:

(i) a substrate of organic high-polymer, (ii) a solid metal structural sheet attached to one surface of said substrate, and (iii) a pressure sensitive adhesive disposed on the other surface of said substrate which composit is adapted to be bent by hand and to hold its shape in free form; and (b) at least one member, having a predetermined shape, which is adhered to said shape-holding supporting composite plate through said pressure sensitive adhesive on said plate in a supported relation thereto.

2. An assembly as claimed in claim 1 wherein a composite plate is adhered to a supporting structure, selected from the group consisting of a wall and a substantially horizontal surface, through a portion of the pressure sensitive adhesive on said plate.

3. An assembly set according to claim 1, wherein said organic high-polymer is foamed resin or elastomer.

4. An assembly set according to claim 1, where the supporting plate member, which was composed of said substrate, said metal sheet, said pressure sensitive adhesive and a release liner prior to being adhered to said member, is adapted to be cut.

5. An assembly set according to claim 3, where the supporting plate member, which was composed of said substrate, said metal sheet, said pressure sensitive adhesive and a release liner prior to being adhered to said member is adapted to be cut.

6. An assembly set according to 1, 3, 4 or 5, wherein said metal sheet is an aluminum sheet.

7. An assembly set according to claim 6, wherein an outer surface of said metal sheet is faced with a facing material such as a plastic film, a sponge sheet, cloth or paint.

8. An assembly set according to claim 7, where the supporting plate member, which was composed of said substrate, said metal sheet, said pressure sensitive adhesive, release liner and said facing material, prior to being adhered to said member, is adapted to be cut.

9. An assembly set according to claim 3, wherein a surface of said metal sheet disposed away from said substrate has a facing material thereon selected from the group consisting of a plastic film, a sponge sheet, cloth and paint.

10. An assembly set according to claim 9, where the supporting plate member, which was composed of said substrate, said metal sheet, said pressure sensitive adhesive, a release liner and said facing material prior to being adhered to said member, is adapted to be cut.

11. An assembly set according to claim 1 wherein a surface of said metal sheet disposed away from said substrate has facing material thereon selected from the group consisting of a plastic film, a sponge sheet, cloth and paint.

12. An assembly set according to claim 11, where the supporting plate member, which was composed of said substrate, said metal sheet, said pressure sensitive adhesive, a release liner and said facing material prior to being adhered to said member, is adapted to be cut.

13. An assembly set according to claim 1 comprising a multiplicity of said supported members adhered to at least one of said composite plates, each supported member being adhered to at least one composite plate through at least a portion of said pressure sensitive adhesive, in a spatially pre-selected configuration.

14. An assembly as claimed in claim 13 comprising one composite plate.

15. An assembly as claimed in claim 13 comprising a multiplicity of said composite plates, wherein each of said composite plates is adhered to two surfaces, at least one of which is a supported member.

* * * * *